C. WIDEMANN & J. HEIM.
VENETIAN-BLIND.
No. 175,803.                                 Patented April 4, 1876.
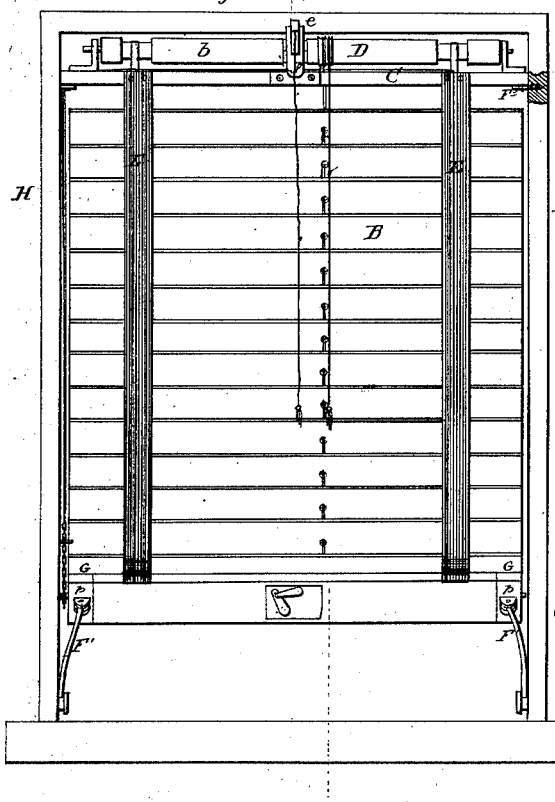
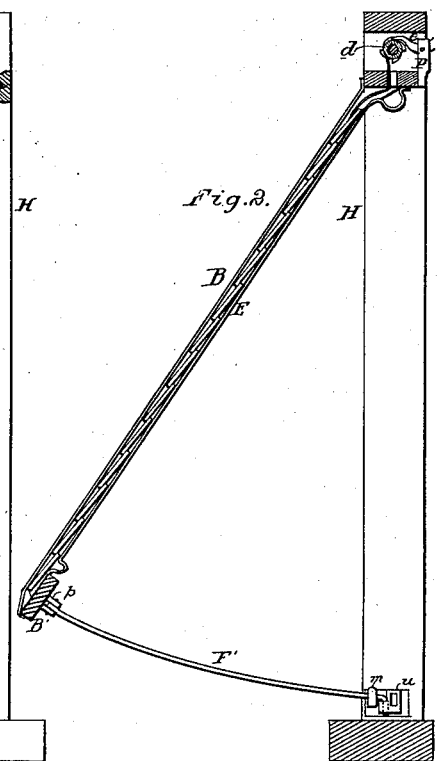
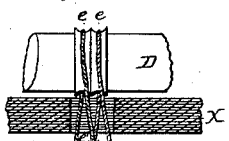
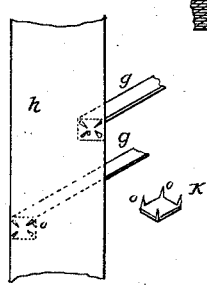
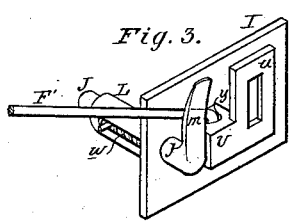
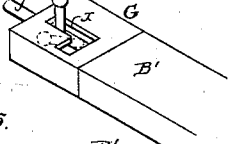
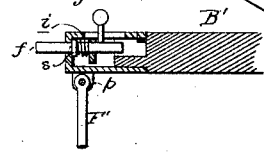
Witnesses:
Courtney A. Cooper
Geo Bacon
Charles Widemann
Jacob Heim
By their atty
Charles E Foster

UNITED STATES PATENT OFFICE.

CHARLES WIDEMANN AND JACOB HEIM, OF NEW YORK, N. Y.

IMPROVEMENT IN VENETIAN BLINDS.

Specification forming part of Letters Patent No. 175,803, dated April 4, 1876; application filed February 1, 1876.

*To all whom it may concern:*

Be it known that we, CHARLES WIDEMANN and JACOB HEIM, of the city, county, and State of New York, have invented certain Improvements in Venetian Blinds, of which the following is the specification:

Our invention relates to certain improvements on the Venetian blind for which Letters Patent of the United States were granted to Charles Widemann, September 11, 1875; the improvements consisting in certain devices, fully described hereafter, combined with the blind, to facilitate the manipulation of the same.

In the drawing, Figure 1 is an elevation, looking outward, showing the blind suspended within a window-frame, and adjusted to serve as a temporary awning. Fig. 2 is a vertical section on the line 1 2, Fig. 1; Figs. 3 to 7, detached views, showing parts of the blind and the appliances for adjusting and manipulating the same.

H H represent the window-frame, within which is suspended a Venetian blind, B, similar (with certain exceptions hereafter named) to that shown in the before-named patent of Charles Widemann. The cross-piece C of the blind, which supports the roller D, and to which the "ladders" E E are secured, may rest upon and be attached to studs F F, consisting of metal bars, cut at an angle to forms fins $a$ $a$, projecting forward, as shown in Fig. 1, so that when driven into the frame they will not work outward; or it may be attached in any other suitable manner.

The roller D is reduced to form the tape-drums, as heretofore, and has at the center a ratchet, $d$. A pawl, $e$, hung to a standard, P, secured to the edge of the cross-piece C, engages with the teeth on ratchet $d$, and retains the roller in its position until relieved by raising the pawl by means of a cord attached thereto.

By placing the ratchet at the center the twisting of the roller, which results when it is secured at one end, is prevented.

Instead of a drum at the end to receive the elevating-cord, there are, at or near the center, two grooved pulleys, $e$ $e$, and upon the lower slat B' a single pulley, $e'$; and the cord is secured to the lower slat, passes through openings in all the slats $x$, Fig. 6, over one of the pulleys $e$, round the pulley $e'$, over the other pulley $e$, its free end hanging outside of the blind, and being drawn upon to elevate the latter.

By this arrangement not only is the twisting of the roller prevented, but greater power can be applied, as is necessary with large heavy blinds suitable for public buildings.

In order to prevent the bolts $f$, which secure the lower slat B' within the window-frame, working back by the constant movement of the blind, a spring, $i$, is coiled round each bolt to bear on a shoulder, $s$, and throw the bolt forward.

In order to form a compact and neat attachment for the bolts and the retaining-rods F', by which the blinds are supported in the inclined position shown in Fig. 2, to serve as an awning, we employ metal boxes or cases G, Figs. 4 and 5, each adapted to the end of the slat B' containing the bolt, and provided with lugs $p$, for securing the end of the rod F'. In the upper side of the case is an L-shaped slot, $x$, in which the handle $t$ of the bolt may be turned to the position shown in dotted lines, Fig. 4, to prevent the bolt shooting forward. The bolt is retained by a slotted hasp, $u$, secured to a lug, $v$, on a plate, I, adapted to be secured to the side of the window-frame; and in the lug $v$ is an opening, $y$, for the reception of the bent end of the adjacent rod F'. In order to prevent the rod from working loose, the finger $m$ of a bar, J, sliding in a case, L, attached to the plate I, is caused to bear constantly against the rod by a spring, $w$, coiled round the bar, as shown in Fig. 3.

It will be seen that the plate I, with its appliances, forms an attachment, serving both as a bolt-hasp and a retainer for the rod F', capable of being easily and quickly applied.

In ordinary Venetian blinds the strips $g$ $g$ of the ladders are attached to the side strips $h$ by sewing; but where the blind is hung outside and exposed the threads are apt to rot. To obviate this we secure each strip $g$ to the side strip by means of a metal retainer, K, consisting of a plate having sharp fingers, which penetrate both strips and are bent down or clinched.

We claim—

1. The combination, in a Venetian blind, of the ratchet $d$, arranged in the center of the roller D, and a pawl, $e$, hung to a standard, P, on the cross-strip C, substantially as set forth.

2. The combination of the slats, having slots in the center, grooved pulleys $e\ e$ on the roller, the pulley $e'$ on the lower slat, and the cord attached to said slat, and passing through said slots and round the pulleys, as shown and described.

3. The combination of the slat B', bolts $f\ f$, and springs $s\ s$, as set forth.

4. The case G, adapted to the slat B', carrying the bolt $f$, having an L-shaped slot, $x$, and provided with lugs $p$ for the attachment of the rod F', as specified.

5. The spring-bars J, having fingers $m$, arranged to retain the rods F', as set forth.

6. The plate I, carrying the hasps $u$, hollow lugs $v$, and spring-bars J, and adapted to be attached to the window-frame, as set forth.

7. The combination, in a Venetian blind, of the side strip $h$, cross-strips $g\ g$ of woven fabric, and metal retainers K, extending through both strips and bent down, as set forth.

In testimony whereof we have signed our names to this specification in the presence of two subscribing witnesses.

CHARLES WIDEMANN.
JACOB HEIM.

Witnesses:
E. STEPHENSON,
S. DEAN KELLY.